Figure 1:
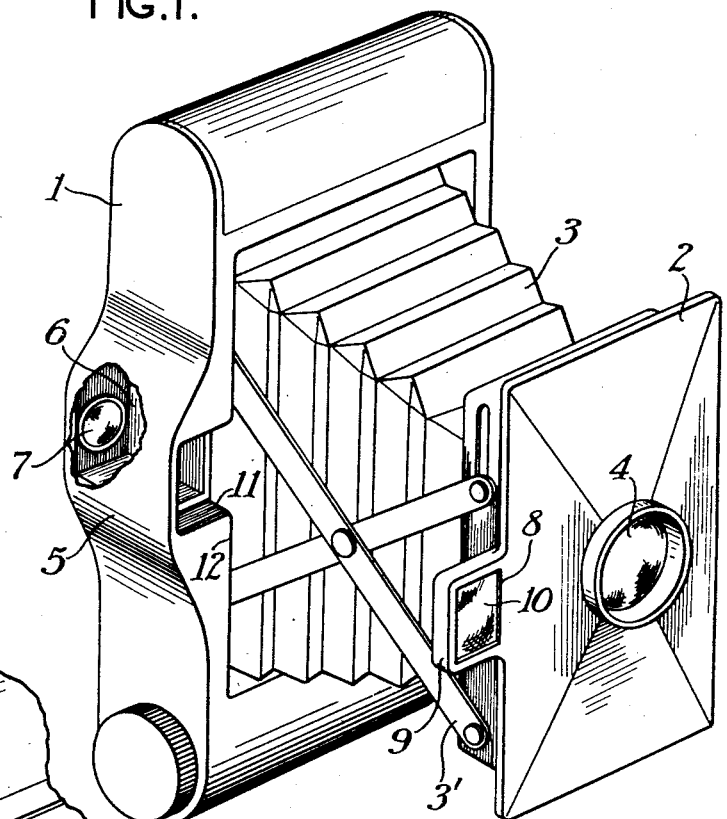

Aug. 8, 1939.         C. W. CRUMRINE         2,168,977
VIEW FINDER FOR FOLDING CAMERAS
Filed July 21, 1937

Chester W. Crumrine
INVENTOR

BY
ATTORNEYS

Patented Aug. 8, 1939

2,168,977

UNITED STATES PATENT OFFICE 2,168,977

VIEW FINDER FOR FOLDING CAMERAS

Chester W. Crumrine, Rochester, N. Y., assignor to Eastman Kodak Company, Rochester, N. Y., a corporation of New Jersey Application July 21, 1937, Serial No. 154,853

7 Claims. (Cl. 88—1.5)

The present invention relates to photography, and particularly to a view finder which is especially adapted for use in connection with a folding camera.

One object of the present invention is the provision of a direct view finder for folding cameras which is adapted to be moved to and held in a retracted position when the camera is closed, and which is so arranged as to be projected into an operative position, automatically, when the camera is opened to its picture-taking position. Another object is the provision of a view finder of the type referred to which is adapted to be wholly contained within the camera body when the camera is folded to its closed position. And still another object of the present invention is the provision of a direct view finder of the type referred to wherein the rear element of the finder is integral with the camera body, and the front element of the finder is carried by the lens board of the camera to move therewith. And a further object of the invention is the provision of a direct view finder so combined with a folding camera that sighting is done through the camera body by holding the camera at eye level. And yet another object of the invention is to so combine the direct view finder with a folding camera that the lens board of the camera when extended does not interrupt or limit the field of view formed by the diverging rays of the front finder element. And still a further object is the provision of a reflecting view finder which is combined with a folding camera in such a way that it can be contained within the camera body when the camera is closed, and can be automatically moved to its operative position when the camera is opened to its picture-taking position.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing in which, Fig. 1 is a perspective view of a folding camera in its extended picture-taking position, and showing a direct view finder combined therewith in accordance with one embodiment of the present invention, Fig. 2 is a perspective view of the camera shown in Fig. 1 folded to its closed or carrying position, and Fig. 3 is a perspective view of a portion of the camera body, and illustrating how a right angle finder can be substituted for the direct view finder without going beyond the scope of the present invention.

Like reference characters refer to corresponding parts throughout the drawing.

Figure 2:
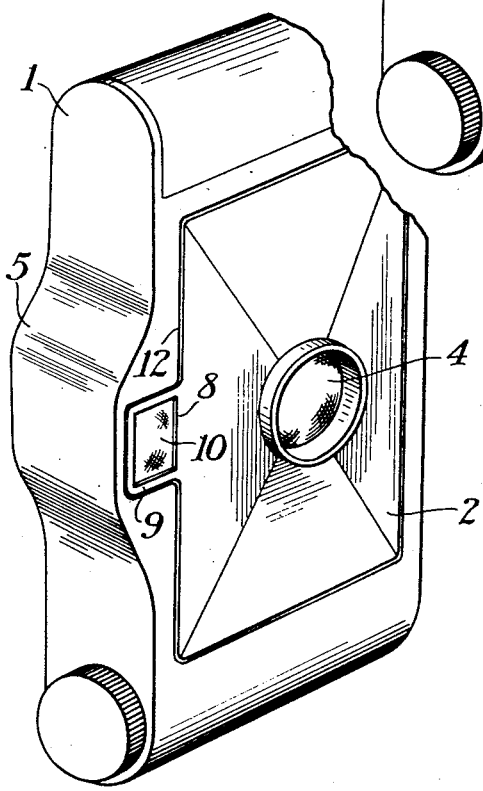
Figure 3:
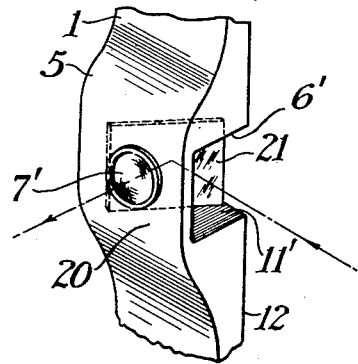

Referring now to the drawing, and particularly to Figs. 1 and 2 wherein a direct view finder is shown combined with a well-known camera of the fixed focus type, 1 designates the camera body broadly to which the lens board 2 is connected by bellows 3. The lens board 2 has an objective 4 positioned thereon, and is supported by a well-known system of lazy tongs 3' which are connected between the camera body 1 and the lens board 2 so that the lens board in moving between its extended and folding positions is always maintained parallel to the camera body. The lazy tong system may or may not be provided with a spring actuating means in a known manner, not shown, which would cause the lens board 2 to snap to its extended position automatically upon the release of a latch. The camera body is of hollow construction to permit of retraction of the lens board 2 thereinto, as shown in Fig. 2, and the parts are so proportioned and arranged that when the camera is closed, the front surface of the lens board 2 will be flush with and form a continuation of the front of the camera body.

One side wall of the camera body is provided with an enlargement 5 through which an opening 6, forming the rear finder element, extends. Situated in the rear end of the opening 6 is a magnifying lens 7 through which the operator sights from the rear of the camera body. Cooperating with the rear finder element is a front finder element indicated broadly as 8. This front finder element comprises a frame 9 which is integral with and extends from one edge of the lens board 2 so that the front surface thereof is flush with the face of the lens board. Fixed in the frame 9 is a collecting lens 10 which forms the image to be photographed, and which image is magnified by the magnifying lens 7. The front finder element should be located on the lens board 2 so that when the camera is in either its extended picture-taking position or its collapsed position, the two finder elements will be in alignment. With the type of camera shown, since the lens board 2 in moving to and from its extended and collapsed positions is maintained in parallel relation with the camera body, the two finder elements are always in alignment; but it will be appreciated that cameras using other lazy tong systems can be used so long as the front finder element is in alignment with the rear finder element in the fully extended or fully collapsed positions of the lens board.

The purpose of having the front finder element in alignment with the rear finder element in the closed position of the camera has nothing to do with the functioning of the finder itself, but does provide for the housing of the front finder element as will be hereinafter described. The forward end of the opening 6 of the rear finder element is recessed as shown at 11 to receive the front finder element 8 when the camera is closed, see Fig. 2. The recess 11 communicates with the bellows opening 12 in the camera body, and its dimensions are such that when the camera is closed the front finder element 8 will be received therein so as to be flush with the front wall of the camera body 1, see Fig. 2.

The magnifying lens 7 and the collecting lens 10 are so calibrated that they are in proper focus when the lens board 2 is extended to its picture-taking position. The divergence of rays passing through the magnifying lens 7 is slight so that they will not be restricted by the dimension of the opening 6, but, on the other hand, the divergence of rays of the collecting lens 10 is much greater necessitating placing it on or near the lens board. It will be appreciated, by those skilled in the art, that if the collecting lens 10 were mounted on the front face of the camera body 1, the rays thereto, due to their great divergence, would be cut off at one side by the bellows and lens board which extend an appreciable distance in front of the camera body when in a picture-taking position.

Although I have chosen to illustrate the view finder as being an optical view finder, it is to be understood that the lenses could be omitted giving a direct view finder of the frame type without going beyond the scope of the present invention. If the magnifying lens 7 were removed from the rear end of the opening 6, a small aperture or peep-hole would remain which, in combination with the opening 6, would form a rear finder element of the frame type well known in the art. In like manner, removing the collecting lens 10 from the front finder element 8 would leave the frame 9 which would constitute a front finder frame which would cooperate with the rear finder element to give a direct view finder of the well-known frame type.

In Fig. 3 I have shown how a finder of the reflecting type could be incorporated on a folding camera so that it would be contained within the camera body when the camera was closed, or would be automatically removed to its operative position when the camera was opened. Since the adaptation of a reflecting finder to the camera will necessitate only a change in the rear finder element, all other parts of the camera and finder being identical with that shown in connection with Figs. 1 and 2, only that portion of the camera body including the rear finder element is shown. The enlargement 5 on one side of the camera body is provided in this instance with an opening 6' which does not extend directly through the camera body 1, but has an exit in the side wall 20 of the enlargement 5 which is covered by a magnifying lens 7'. A right angle prism 21, or mirror if desired, is positioned in the opening 6' so as to collect the rays from the collecting lens 10 mounted on the lens board 2 and direct the same through the magnifying lens 7'. The forward end of the opening 6' is provided with a recess 11', identical with the recess 11 described in connection with the embodiment shown in Figs. 1 and 2, the dimensions of which are such as to receive and contain the front finder element so that the front space thereof will be flush with the front of the camera body 1, as above described.

It will be apparent from the above description that by combining a view finder with a folding camera according to the present invention the finder is fairly well protected against injury when the camera is folded to its carrying position. Combining the camera with the finder in this manner also provides a neat appearing structure, particularly when the camera is closed, wherein the finder is essentially an integral part of the camera. It will also be appreciated that the finder will be brought to its proper operating position at the same time the camera is opened, and will be housed simultaneously with the closing of the camera.

Although I have shown and described certain specific embodiments of my invention, I am fully aware that many modifications thereof are possible. My invention, therefore, is not to be restricted except insofar as is necessitated by the prior art and by the spirit of the appended claims.

What I claim is:

1. In a folding camera, the combination of a camera body, a housing on one side of the camera body, said housing having an opening in its front wall and a second opening in a wall at right angles to the front wall, an image-forming means in said second opening, an optical element in said housing for directing rays of light entering the first opening onto the image-forming means, a lens board foldably mounted on said camera body to move to and from an extended picture-taking position, a front finder element carried by said lens board, said front finder element arranged to be in alignment with the opening in the front wall of the housing when the lens board is in its extended position to form a complete view-finder, and adapted to be received in said first opening when the lens board is moved to its collapsed position.

2. In a folding camera the combination of a camera body having a recess in the front wall thereof, a lens board of a size and shape to fill said recess, means for foldably mounting said lens board on said camera body for movement between a folded position wherein said lens board fills said recess to be flush with the front wall of the camera body and forms a part thereof, and an extended picture taking position wherein said lens board is parallel to but spaced from the front wall of said camera body, said camera body provided with an opening extending therethrough and providing a rear direct finder element, a front finder element carried by said lens board and arranged thereon whereby the same is adapted to be in alignment with said rear finder element to form a complete view finder when said lens board is in the picture taking position, and adapted in the collapsed position of said lens board to be received in said opening to be flush with the front wall of said camera body.

3. In a folding camera the combination of a camera body having a recess in the front wall thereof, a lens board of a size and shape to fill said recess, means for foldable mounting said lens board on said camera body for movement between a folded position wherein said lens board fills said recess to be flush with the front wall of the camera body and forms a part thereof, and an extended picture taking position wherein said lens board is parallel to but spaced from the front wall of said camera body, said camera body provided with an opening extending therethrough, optical means located in said opening to form a rear finder element, a front optical finder element carried by said lens board, and arranged thereon whereby the same is adapted to be in optical alignment with said rear finder element to form a complete view finder when said lens board is in its picture taking position and adapted in the collapsed position of said lens board to be received within said opening so as to be flush with and form a part of the front wall of the camera.

4. In a folding camera the combination of a camera body having a recess in the front wall thereof, a lens board of a size and shape to fill said recess, means for foldably mounting said lens board on said camera body for movement between a folded position wherein said lens board fills said recess to be flush with the front wall of the camera body and forms a part thereof, and an extended picture taking position wherein said lens board is parallel to but spaced from the front wall of said camera body, said camera body provided with an opening extending therethrough and located adjacent one side of said recess, a portion of said opening adjacent the front wall of said camera being contiguous with said recess, optical means located in said opening to form a rear finder element, a front finder element extending to one side of said lens board in optical alignment with said rear finder element, to form in combination with said rear finder element when said lens board is in its picture taking position, a complete view finder, and arranged on said lens board whereby the front surface thereof is contiguous with the face of said lens board, and of a size whereby it is adapted, when said lens board is moved to its collapsed position, to be received in said opening in the camera body with the front surface thereof flush with the front wall of the camera body.

5. In a folding camera the combination of a camera body having a recess in the front wall thereof, a lens board of a size and shape to fill said recess, means for foldably mounting said lens board on said camera body for movement between a folded position wherein said lens board fills said recess to be flush with the front wall of the camera body and forms a part thereof, and an extended picture taking position wherein said lens board is parallel to but spaced from the front wall of said camera body, said camera body provided with an opening extending therethrough and located adjacent one side of said recess, the forward end of said opening being enlarged to form a finder recess contiguous with said recess in the camera body, an optical element located in said opening behind the enlarged portion thereof and forming a rear finder element, a front finder element located on said lens board in optical alignment with said rear finder element to form therewith, when said lens board is in its picture taking position, a complete view finder, and adapted when said lens board is in its collapsed position to fill said finder recess whereby its front surface is flush with the front wall of said camera body.

6. In a folding camera the combination of a camera body having a recess in the front wall thereof, a lens board of a size and shape to fill said recess, means for foldably mounting said lens board on said camera body for movement between a folded position wherein said lens board fills said recess to be flush with the front wall of the camera body and forms a part thereof, and an extended picture taking position wherein said lens board is parallel to but spaced from the front wall of said camera body, said camera body provided with an opening extending therethrough and located adjacent one side of said recess, the forward end of said opening being enlarged to form a finder recess contiguous with said recess in the camera body, an optical element located in said opening behind the enlarged portion thereof and forming a rear finder element, a front finder element located on said lens board in optical alignment with said rear finder element to form therewith, when said lens board is in its picture taking position, a complete view finder, said front finder element including a frame member integral with and extending from one side of said lens board with its front surface in the plane of the face of said lens board, said frame having dimensions equal to that of said finder recess, whereby the same is adapted to be received in said finder recess with its front surface flush with the front wall of the camera body when said lens board is moved to its collapsed position.

7. In a folding camera the combination of a camera body having a recess in the front wall thereof, a lens board of a size and shape to fill said recess, a lens board erecting mechanism connecting said lens board to said camera body whereby the lens board in moving between an extended fixed focus picture taking position and a collapsed position, wherein it is received in said recess flush with the front wall of said camera body to form a part thereof, is maintained parallel to the front wall of said camera body, an opening extending through said camera body at one side of and adjacent said recess, that portion of said opening adjacent the front wall of the camera body enlarged to form a finder recess contiguous with said recess in the camera body, an optical finder element located at the rear of said opening, a front finder element carried by said lens board in optical alignment with said optical finder element to form therewith, when said lens board is in its picture taking position, a complete view finder, said front finder element comprising a frame integral with and extending from the side of said lens board with its front surface flush with the face of said lens board, said frame having dimensions equal to that of said finder recess whereby the same is adapted to be received in said recess with its front surface flush with the front wall of the camera body when the same is moved to its collapsed position, and a second optical element in said frame adapted to cooperate with said first mentioned optical element to form a view finder of universal focus when the lens board is in its picture taking position.

CHESTER W. CRUMRINE.